United States Patent
Carlson et al.

(10) Patent No.: US 9,342,119 B1
(45) Date of Patent: May 17, 2016

(54) METHOD AND APPARATUS FOR DISSIPATING HEAT IN A MOBILE DEVICE

(71) Applicant: Marvell International Ltd., Hamilton (BM)

(72) Inventors: Gregory F. Carlson, Corvallis, OR (US); Steven M. Goss, Corvallis, OR (US)

(73) Assignee: Marvell International Ltd., Hamilton (BM)

( * ) Notice: Subject to any disclaimer, the term of this patent is extended or adjusted under 35 U.S.C. 154(b) by 24 days.

(21) Appl. No.: 14/189,775

(22) Filed: Feb. 25, 2014

Related U.S. Application Data (60) Provisional application No. 61/768,651, filed on Feb. 25, 2013, provisional application No. 61/768,660, filed on Feb. 25, 2013, provisional application No. 61/768,668, filed on Feb. 25, 2013.

(51) Int. Cl.
*G06F 1/20* (2006.01)

(52) U.S. Cl.
CPC .................................... *G06F 1/20* (2013.01)

(58) Field of Classification Search
CPC .... Y02E 60/12; H04W 52/02; H04W 52/028; H04W 52/0229; H04W 52/0225; H04M 19/08; H04M 1/0262; H04M 1/04; H04B 1/3883; H04B 1/1615; H02J 7/0044; H02J 17/00
USPC .......................... 455/572–574, 556.1
See application file for complete search history.

(56) References Cited

U.S. PATENT DOCUMENTS

| | | | |
|---|---|---|---|
| 7,702,636 B1* | 4/2010 | Sholtis et al. | 707/999.1 |
| 7,957,131 B1* | 6/2011 | Mongia et al. | 361/679.46 |
| 8,787,013 B1* | 7/2014 | Czamara et al. | 361/679.47 |
| 2002/0097559 A1* | 7/2002 | Inoue | 361/688 |
| 2004/0190256 A1* | 9/2004 | Genova | H01L 23/367 361/703 |
| 2007/0167198 A1* | 7/2007 | Subramaniam et al. | 455/575.1 |
| 2008/0068810 A1* | 3/2008 | Watanabe | 361/720 |
| 2012/0134098 A1* | 5/2012 | Homer et al. | 361/679.33 |
| 2013/0271905 A1* | 10/2013 | Sullivan | 361/679.02 |
| 2014/0192480 A1* | 7/2014 | Winkler | G06F 1/203 361/679.47 |

* cited by examiner

*Primary Examiner* — Kamran Afshar
*Assistant Examiner* — Ather Mohiuddin (57) ABSTRACT

Embodiments include a method for dissipating heat in a mobile device via a heat dissipating component, wherein the mobile device comprises (i) a component that generates heat while the mobile device is operational, and (ii) a port that is thermally coupled to the component, the method comprising activating the mobile device to be operational; and coupling the heat dissipating component to the port of the mobile device, wherein the heat that is generated by the component while the mobile device is operational is dissipated through the heat dissipating component via the port.

20 Claims, 5 Drawing Sheets

Fig. 6

METHOD AND APPARATUS FOR DISSIPATING HEAT IN A MOBILE DEVICE

CROSS REFERENCE TO RELATED APPLICATIONS

The present disclosure claims priority to U.S. Provisional Application No. 61/768,651, filed Feb. 25, 2013; to U.S. Provisional Application No. 61/768,660, filed Feb. 25, 2013; and to U.S. Provisional Application No. 61/768,668, filed Feb. 25, 2013, which are incorporated herein by reference in their entirety.

TECHNICAL FIELD

Embodiments of the present disclosure relate to mobile devices, and in particular to methods and apparatuses for dissipating heat in a mobile device.

BACKGROUND

A mobile device is a portable computing device that typically has an operating system (OS), and can run various types of application software. Examples of mobile devices include mobile phones, smart phones, tablet computers, laptops, palmtops, electronic book readers, and the like. Many of these mobile devices are equipped with relatively high computational power, e.g., by incorporating high performance processors, high resolution displays, etc.

As the computing power of mobile devices increases, heat produced by various components of these mobile devices also generally increases. For example, while playing a computationally intensive game in a smart phone, various components of the smart phone can easily heat up. Also, some mobile devices are relatively small, and may not have an adequate arrangement to efficiently dissipate heat.

SUMMARY

In various embodiments, the present disclosure provides a method for dissipating heat in a mobile device via a heat dissipating component, wherein the mobile device comprises (i) a component that generates heat while the mobile device is operational, and (ii) a port that is thermally coupled to the component, the method comprising activating the mobile device to be operational; and coupling the heat dissipating component to the port of the mobile device, wherein the heat that is generated by the component while the mobile device is operational is dissipated through the heat dissipating component via the port.

In various embodiments, the present disclosure also provides a mobile device comprising a component that generates heat while the mobile device is operational; and a port that is thermally coupled to the component that generates heat, wherein the port of the mobile device is configured to be coupled to a heat dissipating component.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Various embodiments are illustrated by way of example and not by way of limitation in the figures of the accompanying drawings.

DETAILED DESCRIPTION

Enhanced Cooling of a Mobile Device Using an Output Port

Figure 1A:
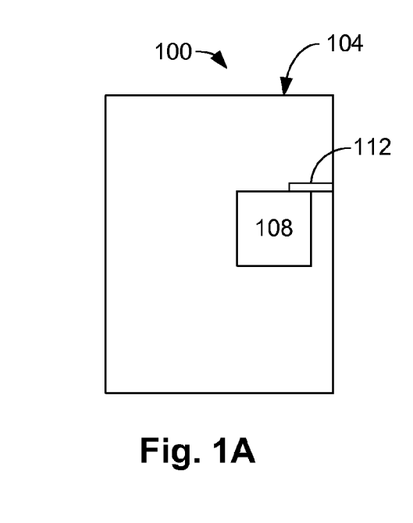
FIGS. 1A, 1B and 1C schematically illustrate a mobile device comprising a port for enhancing cooling of various components of the mobile device.
Figure 1B:
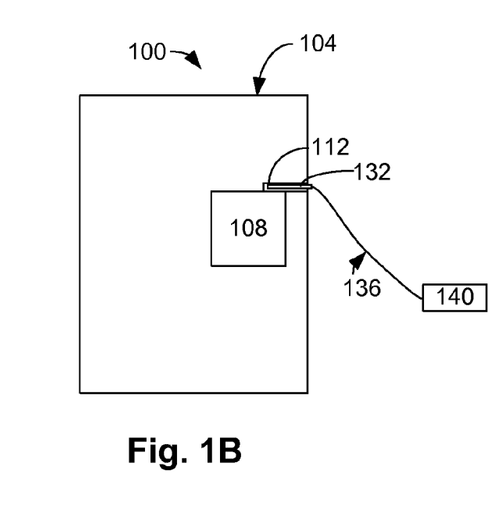
Figure 1C:
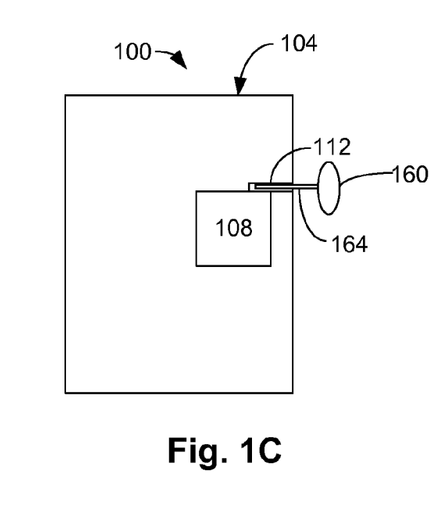

FIGS. 1A, 1B and 1C schematically illustrate a mobile device 100 comprising a port 112 for enhancing cooling of various components of the mobile device 100. The mobile device 100 is an appropriate mobile device, e.g., a mobile consumer electronic device such as a mobile phone, a cellular phone, a smart phone, a tablet computer, a laptop, a palmtop, an electronic book reader, a mobile music player, a mobile video player, a gaming device, or the like.

Referring to FIGS. 1A-1C, in an embodiment, the mobile device 100 comprises a body 104. The body 104 comprises various components of the mobile device 100, e.g., one or more processors, integrated circuits, memories, keyboard, display, and/or the like, e.g., which are typically present in a mobile device and will not be described further herein. Some of these components produce and/or dissipate heat while the mobile device 100 is operational. As an example, the mobile device 100 comprises an example component 108 that produces and/or dissipates heat while the mobile device 100 is operational. The component 108 can be any component in the mobile device 100 that produces and/or dissipates heat, e.g., a processor, a memory, an integrated circuit chip, or the like. Although only one such component is illustrated in FIGS. 1A-1C, the mobile device 100 can have multiple components that produce and/or dissipate heat while the mobile device 100 is operational.

Operation of a mobile device or operating a mobile device (e.g., the mobile device 100) implies, for example, that the mobile device is used by a user (e.g., to make a phone call, to listen to music, to watch a video, to play a game, to browse the Internet, to read an electronic book, to view or take photographs or videos, to otherwise use one or more functions of the mobile device, and/or the like), a processor or another component of the mobile device is operational or functional (e.g., a processor of the mobile device is currently processing instructions to perform a task), and/or the like.

As illustrated in FIGS. 1A-1C, the mobile device 100 comprises a port 112. In an embodiment, the port 112 is thermally coupled to the component 108 (although the port 112 can be thermally coupled to more than one component that produces and/or dissipates while the mobile device 100 is operational). The thermal coupling between the component 108 and the port 112 is achieved, for example, by physically attaching at least a part of the port 112 to at least a part of the component 108 (e.g., as illustrated in FIGS. 1A-1C), locating the component 108 and the port 112 in close proximity, thermally coupling the component 108 and the port 112 via another component (e.g., via a heat sink, a metal structure, and/or the like), etc.

The port 112 is, for example, an input and/or an output port of the mobile device 100, e.g., through which the mobile device communicates with another external device. In an example, the port 112 is disposed on a periphery or side of the mobile device 100 (e.g., as illustrated in FIGS. 1A-1C), on a back side of the mobile device 100, or the like.

In an example, the port 112 is an audio port of the mobile device, and a user of the mobile device can plug in an audio connector (e.g., a head phone jack) in the port 112. For example, as illustrated in FIG. 1B, a head phone jack 132 is connected to the port 112 (e.g., inserted in the port 112). A wiring 136 inter-connects the headphone jack 132 to a headphone 140. The wiring 136 transmits audio signals from the mobile device 100 (e.g., from the port 112) to the head phone 140. While the mobile device 100 is operational, the component 108 generates or dissipates heat. The heat from the component 108 is transmitted to the port 112, and to the wiring 136 and the headphone 140 via the headphone jack 132. The heat is dissipated by the headphone jack 132, the wiring 136 and/or the headphone 140. Thus, the headphone jack 132, the wiring 136 and/or the headphone 140 act as heat sinks (or heat dissipating components) for dissipating heat from the component 108, via the port 112. The port 112, the headphone jack 132, the wiring 136 and/or the headphone 140, thus, enhance a cooling of various components of the mobile device 100.

In an embodiment, the wiring 136 has metal wires (e.g., used for transmitting audio signals from the mobile device 100 to the headphone 140), which are coated by a thermally conductive material. Such a thermally conductive material aids in heat dissipation by the wiring 136.

In an embodiment, additional metal (in additional to the metal used in the wire for transmitting audio signals from the mobile device 100 to the headphone 140) are included in the wiring 136. For example, the additional metal is deposited inside the outer coating of the wiring 136. In another example, at least a part of the additional metal of the wiring 136 is exposed to the ambient air. In another example, at least a part of the additional metal of the wiring 136 is disposed at or near an outer periphery of the wiring 136. Such additional metal, for example, aids in heat dissipation by the wiring 136. In an embodiment, such additional metal does not transmit audio signals from the port 112 to the headphone 140, and is included in the wiring 136 for heat dissipation purposes.

Although in FIG. 1B the port 112 is an audio output port for connecting a headphone jack, in another embodiment (and not illustrated in FIG. 1B), the port 112 can be any other port of the mobile device 112 (e.g., a port to receive external power for charging the mobile device 100, a Universal Serial Bus (USB) port, a port that receives an input from a microphone, or the like).

In an embodiment, when the user of the mobile device 100 does not want to listen to an audio output of the mobile device via the headphone 140 (e.g., when the user does not desire to connect the headphone jack 132 in the port 112) and yet desires to dissipate heat from the component 108, the user connects a heat dissipating component in the port 112. For example, FIG. 1C illustrates a heat dissipating component 160 coupled to the port 112. The heat dissipating component 160 comprises, for example, a metal or other appropriate material that has good heat dissipation properties. The heat dissipating component 160 can be shaped in any appropriate shape (e.g., a circular shape, as illustrated in FIG. 1C). The heat dissipating component 160 further comprises a plug 164 that can be plugged into (i.e., inserted into) the port 112. In an example, the heat dissipating component 160 is a metal plug that can be inserted in the port 112.

While the mobile device 100 is operational, the component 108 generates or dissipates heat. The heat from the component 108 is transmitted to the port 112, and to the heat dissipating component 160, from which heat is dissipated in the ambient air. Thus, the heat dissipating component 160 acts as a heat sink by dissipating heat from the component 108, via the port 112, to the ambient air. The port 112 and the heat dissipating component 160, thus, enhance a cooling of various components of the mobile device 100.

In an embodiment, the heat dissipating component 160 has a shape or a design that is of interest to a user of the mobile device 100. For example, if the user of the mobile device 100 is a fan of a football team, the heat dissipating component 160 can be shaped in a form of a logo of the football team (or include a sticker or metal work that depicts the logo of the football team). In another example, the heat dissipating component 160 can be shaped in a form of a logo of a manufacturer, a seller or a service provider associated with the mobile device 100.

Figure 2:
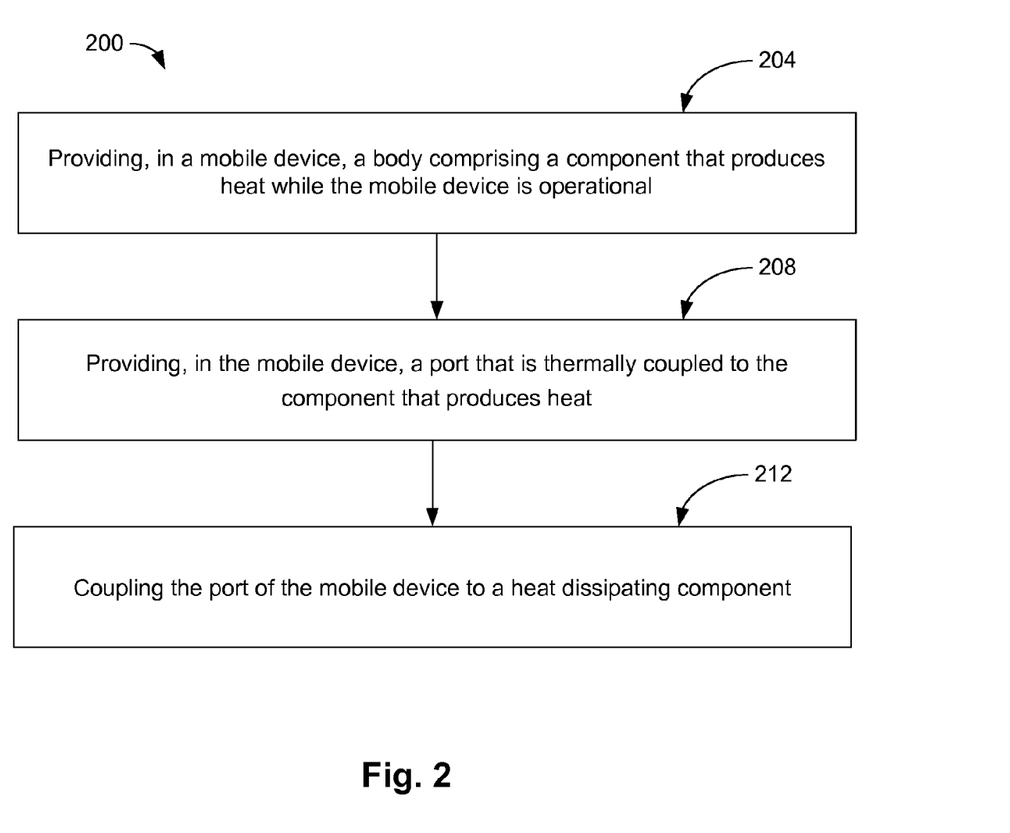
FIG. 2 is a flow diagram of a method to operate the mobile device of FIGS. 1A-1C.

FIG. 2 is a flow diagram of a method 200 to operate the mobile device 100 of FIGS. 1A-1C. At 204, provided in a mobile device (e.g., the mobile device of FIGS. 1A-1C) is a body comprising a component (e.g., component 108) that produces or generates heat while the mobile device is operational. At 208, provided in the mobile device is a port (e.g., port 112) that is thermally coupled to the component that produces heat. At 212, while or subsequent to activating the mobile device to be operational (e.g., by switching on the mobile device, or by activating the mobile device to be operational in any other appropriate manner), the port of the mobile device is coupled to a heat dissipating component (e.g., one of (i) the head phone jack 132, the wiring 136, and the headphone 140, and (ii) the heat dissipating component 160).

Figure 3:
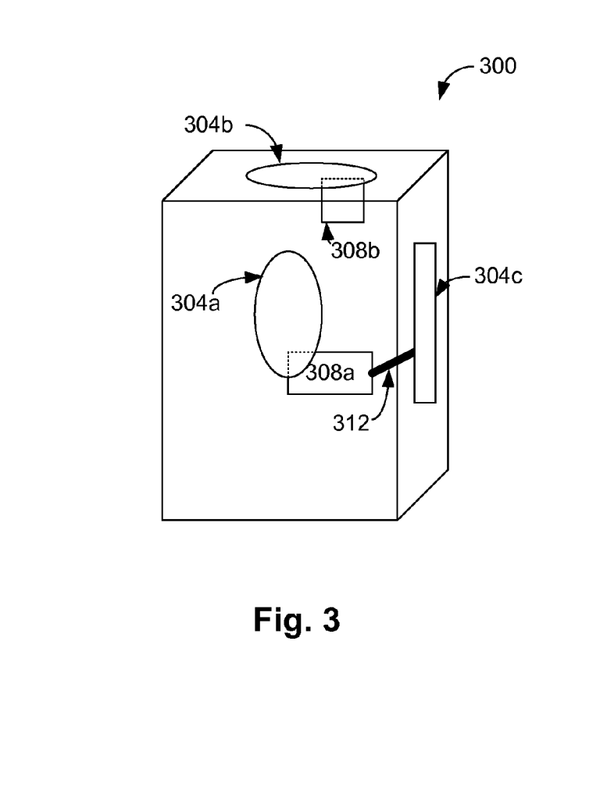
FIG. 3 schematically illustrates a mobile device comprising heat dissipating components for enhancing cooling of various components of the mobile device.

Enhanced Cooling of a Mobile Device Using Heat Dissipating Components Disposed on a Body of the Mobile Device FIG. 3 schematically illustrates a mobile device 300 comprising heat dissipating components 304a, 304b and 304c for enhancing cooling of various components of the mobile device 300. FIG. 3 illustrates a back perspective view of the mobile device 300. The mobile device 300 is an appropriate mobile device, e.g., a mobile consumer electronic device such as a mobile phone, a cellular phone, a smart phone, a tablet computer, a laptop, a palmtop, an electronic book reader, a mobile music player, a mobile video player, a gaming device, or the like.

In an embodiment, the mobile device 300 comprises various components, e.g., one or more processors, integrated circuits, memories, keyboard, display, and/or the like, e.g., which are typically present in a mobile device and will not be described further herein. Some of these components produces and/or dissipates heat while the mobile device 300 is operational. As an example, the mobile device 300 comprises example components 308a and 308b that produces and/or dissipates heat while the mobile device 300 is operational. Each of the components 308a, 308b can be any component in the mobile device 300 that produces and/or dissipates heat, e.g., a processor, a memory, an integrated circuit chip, or the like. Although only two such components are illustrated in FIG. 3, the mobile device 300 can have any different number of components that produce and/or dissipate heat while the mobile device 300 is operational.

The mobile device 300 comprises the heat dissipating components 304a, 304b and 304c. Although three heat dissipating components 304a, 304b and 304c are illustrated in FIG. 3, the mobile device 300 can have any different number of heat dissipating components. In an embodiment, the heat dissipating components 304a, 304b and 304c are disposed on a back side of the mobile device 300, on a periphery of the mobile device 300, and/or the like. For example, in the example of FIG. 3, the heat dissipating component 304a is disposed on a back side (e.g., back cover) of the mobile device 300, and the heat dissipating components 304b, 304c are disposed on periphery or sides of the mobile device 300. In an example, the heat dissipating components 304a, 304b, 304c (or at least a part of these heat dissipating components) are exposed to ambient air.

In an example, one or more of the heat dissipating components 304a, 304b, 304c are pre-fabricated and attached to the mobile device 300 before the mobile device 300 is sold to a user of the mobile device (e.g., during manufacturing of the mobile device 300). In another example, the user attaches (or changes) one or more of the heat dissipating components 304a, 304b, 304c to the mobile device 300, e.g., subsequent to purchasing the mobile device 300.

In an example, one or more of the heat dissipating components 304a, 304b, 304c are attached to a body of the mobile device using, for example an adhesive. In another example, one of the heat dissipating components 304a, 304b, 304c is attached to a slot, a port, a groove, or an opening of the mobile device 300.

In an embodiment, the heat dissipating components 340a, 340b, 340c have shapes or designs that are of interest to a user of the mobile device 300. For example, if the user of the mobile device 300 is a fan of a football team, one or more of the heat dissipating components 340a, 340b, 340c can be shaped in a form of a logo of the football team (or include a sticker or metal work that depicts the logo of the football team). In another example, if the user of the mobile device 300 supports a non-profit organization, one or more of the heat dissipating components 340a, 340b, 340c can be in a form of a logo or a slogan of the non-profit organization. For example, the user may buy the heat dissipating component from the non-profit organization, to financially and morally support the non-profit organization, and to advertise the non-profit organization. In another example, the heat dissipating components 340a, 340b, 340c can be shaped in a form of a logo of a manufacturer, a seller or a service provider associated with the mobile device 300.

In an embodiment, each of the heat dissipating components 304a, 304b, 304c is thermally connected to one or more corresponding components of the mobile device 300 that produce and/or dissipate heat while the mobile device 300 is operational. In the example of FIG. 3, the heat dissipating components 304a, 304c are thermally connected to the component 308a, and the heat dissipating component 304b is thermally connected to the component 308b.

In the example of FIG. 3, the thermal coupling between the heat dissipating component 304a and the component 308a is achieved by physically attaching at least a part of the heat dissipating component 304a to at least a part of the component 308a; and the thermal coupling between the heat dissipating component 304b and the component 308b is achieved by physically attaching at least a part of the heat dissipating component 304b to at least a part of the component 308b.

Also, in the example of FIG. 3, the thermal coupling between the heat dissipating component 304c and the component 308a is achieved by thermally coupling the heat dissipating component 304c and the component 308a via another component 312. The component 312 comprises a material that has good thermal conduction properties, e.g., metal. In an example, the component 312 acts as a heat sink or a heat carrier, by dissipating or transporting heat from the component 308a to the heat dissipating component 304c.

In an embodiment, while the mobile device 300 is operational, the components 308a, 308b generate or dissipate heat. The heat from the components 308a, 308b are transmitted to the heat dissipating components 304a, 304b, 304c, and are dissipated to the ambient air. Thus, the heat dissipating components 304a, 304b, 304c act as heat sinks by dissipating heat from the components 308a, 308b to the ambient air. The heat dissipating components 304a, 304b, 304c, thus, enhances a cooling of various components of the mobile device 300.

Figure 4:
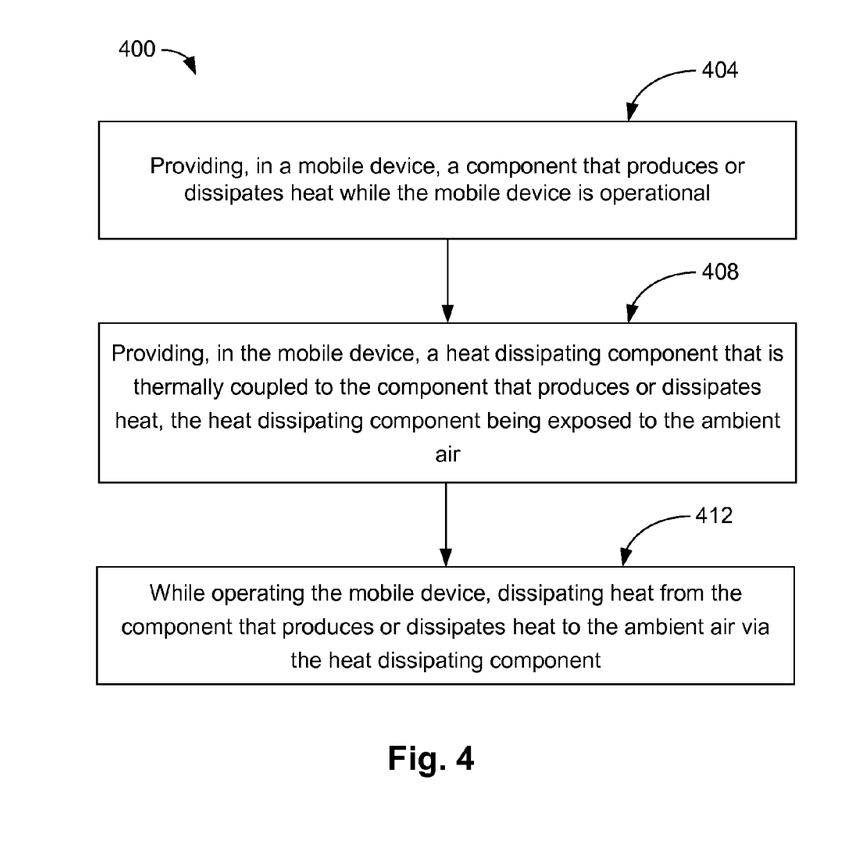
FIG. 4 is a flow diagram of a method to operate the mobile device of FIG. 3.

FIG. 4 is a flow diagram of a method 400 to operate the mobile device 300 of FIG. 3. Referring to FIG. 4, at 404, a component (e.g., one of the components 308a, 308b) is provided in a mobile device (e.g., mobile device 300), where the component produces or dissipates heat while the mobile device is operational. At 408, provided in the mobile device is a heat dissipating component (e.g., one of the heat dissipating components 304a, 304b, 304c) that is thermally coupled to the component that produces or dissipates heat. The heat dissipating component is exposed to the ambient air. In an example, the heat dissipating component is provided on a back side or a periphery of the mobile device. At 412, while operating the mobile device, heat is dissipated from the component that produces or dissipates heat to the ambient air via the heat dissipating component.

Enhanced Cooling of a Mobile Device Using Fluid Flow

Figure 5:
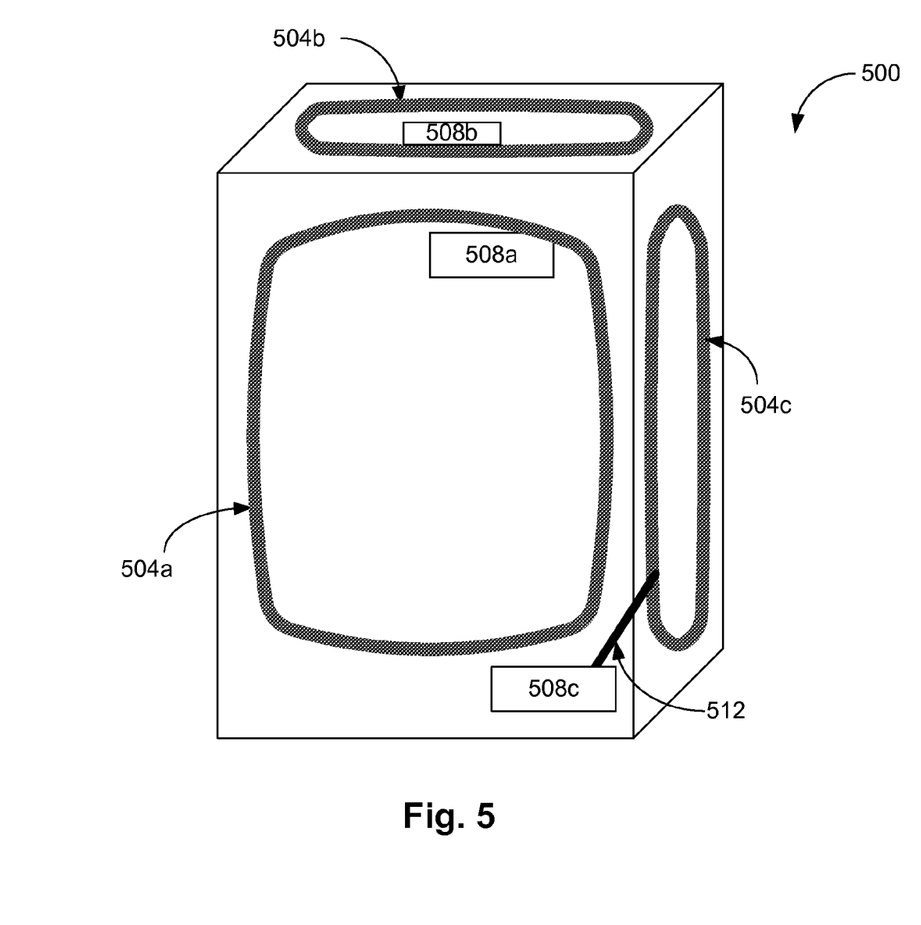
FIG. 5 schematically illustrates a mobile device that uses flow of fluid for enhancing cooling of various components of the mobile device.

FIG. 5 schematically illustrates a mobile device 500 that uses flow of fluid for enhancing cooling of various components of the mobile device 500. FIG. 5 illustrates a back perspective view of the mobile device 500. The mobile device 500 is an appropriate mobile device, e.g., a mobile consumer electronic device such as a mobile phone, a cellular phone, a smart phone, a tablet computer, a laptop, a palmtop, an electronic book reader, a mobile music player, a mobile video player, a gaming device, or the like.

In an embodiment, the mobile device 500 comprises various components, e.g., one or more processors, integrated circuits, memories, keyboard, display, and/or the like, e.g., which are typically present in a mobile device and will not be described further herein. Some of these components produces and/or dissipates heat while the mobile device 500 is operational. As an example, the mobile device 500 comprises example components 508a, 508b, 508c that produces and/or dissipates heat while the mobile device 500 is operational. Each of the components 508a, 508b, 508c can be any component in the mobile device 500 that produces and/or dissipates heat, e.g., a processor, a memory, an integrated circuit chip, or the like. Although only three such components are illustrated in FIG. 5, the mobile device 500 can have any different number of components that produce and/or dissipate heat while the mobile device 500 is operational.

The mobile device 500 further comprises fluid flow paths (henceforth referred to as "paths") 504a, 504b, 504c. As discussed herein later, each of the paths 504a, 504b, 504c comprises appropriate fluid (e.g., liquid and/or gas). The paths 504a, 504b, 504c are, for example, tubes, pipes or tracks that can carry the corresponding fluid. In an example, the paths 504a, 504b, 504c are sealed, e.g., such that the fluid from a path does not leak in the mobile device 500.

Although three paths 504a, 504b and 504c are illustrated in FIG. 5, the mobile device 500 can have any different number of such paths. In an embodiment, the paths 504a, 504b, 504c are disposed on a back side of the mobile device 500, on a periphery of the mobile device 500, and/or the like. For example, in the example of FIG. 5, the path 504a is disposed on a back side (e.g., back cover) of the mobile device 500, and the paths 504b, 504c are disposed on periphery or sides of the mobile device 500.

In an example, one or more of the paths 504a, 504b, 504c are pre-fabricated and attached to the mobile device 500 before the mobile device 500 is sold to a user of the mobile device (e.g., during manufacturing of the mobile device 500). In another example, the user attaches (or changes) one or more of the paths 504a, 504b, 504c to the mobile device 500, e.g., subsequent to purchasing the mobile device 500.

In an example, one or more of the paths 504a, 504b, 504c are attached to a body of the mobile device 500 using, for example an adhesive. In another example, one of the paths 504a, 504b, 504c is disposed on a corresponding groove, opening or slot of the mobile device 500. In an example, at least a part of a path is exposed to ambient air and can be viewed from outside the mobile device. In another example, a path is fully embedded in the mobile device 500, such that the user cannot view the path (e.g., unless the user dismantles or opens a back cover of the mobile device 500).

In an embodiment, each of the paths 504a, 504b, 504c is thermally connected to one or more corresponding components of the mobile device 500 that produce and/or dissipate heat while the mobile device 500 is operational. In the example of FIG. 5, the path 504a is thermally connected to the component 508a, the path 504b is thermally connected to the component 508b, and the path 508c is thermally connected to the component 508c.

In the example of FIG. 5, the thermal coupling between the path 504a and the component 508a is achieved by physically attaching at least a part of the path 504a to at least a part of the component 508a; and the thermal coupling between the path 504b and the component 508b is achieved by physically attaching at least a part of the path 504b to at least a part of the component 508b.

Also, in the example of FIG. 5, the thermal coupling between the path 504c and the component 508c is achieved by thermally coupling the path 508c and the component 508c via another component 512. The component 512 comprises a material that has good thermal conduction properties, e.g., metal. In an example, the component 512 acts as a heat sink or a heat carrier, by transporting heat from the component 508c to the path 504c.

In an embodiment, each of the paths 508a, 508b, 508c comprises an appropriate fluid. For example, each of the paths 508a, 508b, 508c comprises a liquid or a gas that can conduct heat. Merely as an example, the fluid is water or another appropriate liquid.

In an embodiment, while the mobile device 500 is operational, the components 508a, 508b, 508c generate or dissipate heat. The heat from the components 508a, 508b, 508c are transmitted to the fluid in the corresponding path. The fluid heats up (e.g., possibly transforms from a liquid state to a gas state due to the heating), and travels around the path. For example, heat from the component 508a heats up the fluid in the path 504a, and the fluid in the path 504a travels along the path 504a. As the fluid travels along the path 504a, the fluid cools down. Thus, in response to receiving the heat from the component 508a, a circulation of fluid occurs in the corresponding path 504a, which carries away the heat from the component 508a, thereby cooling down the component 508a.

In an example, at least a part of the path 504a is exposed to ambient air outside the mobile device 500, and some of the heat from the path 504a is dissipated to the ambient air while the fluid circulates in the path 504a. The other paths 504b, 504c operate in a similar manner, resulting in enhanced cooling of the corresponding components 508b, 508c. Thus, the paths 504a, 504b, 504c act as heat sinks by dissipating heat from the components 508a, 508b, 508c, by circulating fluid in the corresponding paths. The paths 504a, 504b, 504c, thus, enhance a cooling of various components of the mobile device 500.

In an embodiment, the paths 504a, 504b, 504c have shapes or designs that are of interest to a user of the mobile device 500. For example, the paths 504a, 504b, 504c can be made of colorful material, translucent or transparent material (e.g., so that a user can actually see the fluid circulating in a path) and/or can be filled with colorful liquid (e.g., by coloring the liquid using an appropriate coloring agent), to make the paths visually appealing to the user. In another example, bubbles are intentionally introduced in the fluid in a path, so that the user can see the bubbles move while the liquid is being circulated in the path. In another example, a portion of a path and/or the fluid inside a path can be lit up (e.g., using light emitting diodes (LEDs) or other appropriate light source) to make the fluid circulating more interesting and visually appealing to watch. Additionally, a portion of a path and/or the fluid inside a path can be lit up using, for example, a multi-colored LED or multiple multi-color LEDs. Such lighting can be based upon the user's preference.

Although the paths in FIG. 5 are illustrated to have roughly square shapes, a path can have any unique shape. For example, a path can be shaped to represent a logo of a company, an organization, a sports team, a cartoon character, a manufacturer or service provider of the mobile device 500, or the like.

In an example, a path can be replaceable by a user of the mobile device 500. For example, the path can be inserted in a groove or slot of the mobile device 500, and can be replaced for a variety of reasons (e.g., if the path starts leaking, if the user desires to have a more colorful and vibrant path inserted in her mobile device, etc.).

Figure 6:
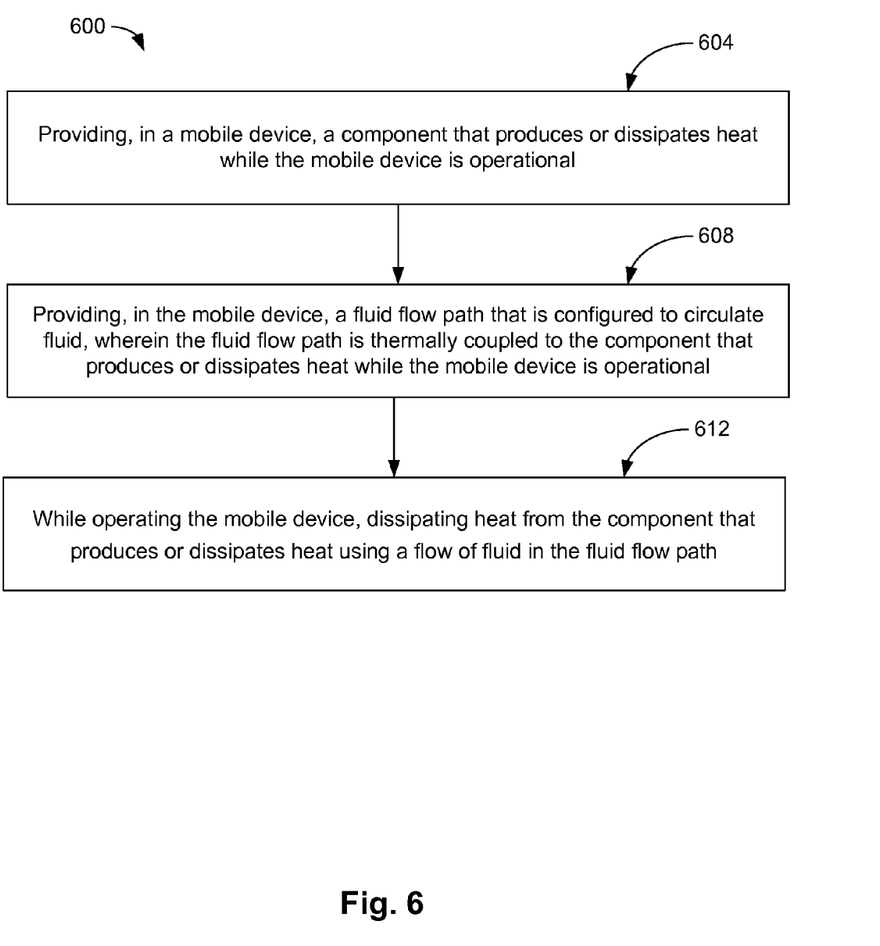
FIG. 6 is a flow diagram of a method to operate the mobile device of FIG. 5.

FIG. 6 is a flow diagram of a method 600 to operate the mobile device 500 of FIG. 5. Referring to FIG. 6, at 604, a component (e.g., one of the components 508a, 508b, 508c) is provided in a mobile device (e.g., mobile device 500), where the component produces or dissipates heat while the mobile device is operational. At 608, provided in the mobile device is a fluid flow path (e.g., one of the paths 504a, 504b, 504c) that is configured to circulate fluid. In an embodiment, the fluid flow path is thermally coupled to the component that produces or dissipates heat while the mobile device is operational. At 612, while operating the mobile device, heat is dissipated from the component that produces or dissipates heat using a flow of the fluid in the fluid flow path.

The description may use the phrases "in an embodiment," or "in embodiments," which may each refer to one or more of the same or different embodiments. The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B." The phrase "at least one of A, B and C" means (A), (B), (C), (A and B), (A and C), (B and C) or (A, B and C). The phrase "(A) B" means (B) or (A and B), that is, A is optional.

Although certain embodiments have been illustrated and described herein, a wide variety of alternate and/or equivalent embodiments or implementations calculated to achieve the same purposes may be substituted for the embodiments illustrated and described without departing from the scope of the present invention. This application is intended to cover any adaptations or variations of the embodiments discussed herein. Therefore, it is manifestly intended that embodiments in accordance with the present invention be limited only by the claims and the equivalents thereof.

What is claimed is:

1. A method for dissipating heat in a mobile device, wherein the mobile device comprises (i) a component that generates heat while the mobile device is operational and (ii) an output port that is thermally coupled to the component, the method comprising:
    activating the mobile device to be operational;
    during a first time period, coupling the output port of the mobile device to a headphone via (i) an audio connector that is inserted in the output port and (ii) wiring that couples the audio connector to the headphone, wherein during the first time period, heat is dissipated from the component via one or more of the audio connector, the wiring, and the headphone; and
    during a second time period, coupling the output port of the mobile device to a heat dissipating component comprising a logo of an organization that is of interest to a user of the mobile device, wherein during the second time period, heat is dissipated from the component via the heat dissipating component comprising the logo of the organization.

2. The method of claim 1, wherein the output port is an audio output port of the mobile device.

3. The method of claim 1, wherein at least a part of the heat dissipating component is exposed to ambient air outside the mobile device.

4. The method of claim 1, wherein the output port is thermally coupled to the component by physically attaching (i) at least a part of the output port to (ii) at least a part of the component.

5. The method of claim 1, wherein the output port is thermally coupled to the component by physically attaching the output port to the component via a thermally conductive material.

6. The method of claim 1, wherein the wiring that couples the audio connector to the headphone is coated using thermally conductive material.

7. The method of claim 1, wherein the organization that is of interest to the user of the mobile device excludes organizations that manufacture the mobile device, sell the mobile device, and provide a communication service to the mobile device.

8. The method of claim 1, wherein the mobile device is one of a mobile phone, a cellular phone, and a smart phone.

9. A system comprising:
    a mobile device comprising (i) a component that generates heat while the mobile device is operational and (ii) an output port that is thermally coupled to the component that generates heat;
    an audio connector configured to be, during a first time period, inserted in the output port;
    a headphone configured to be, during the first time period, coupled to the audio connector via wiring, wherein during the first time period, heat is dissipated from the component via one or more of the audio connector, the wiring, and the headphone; and
    a heat dissipating component comprising a logo of an organization that is of interest to a user of the mobile device, wherein the heat dissipating component is configured to be, during a second time period, coupled to the output port of the mobile device, wherein during the second time period, heat is dissipated from the component via the heat dissipating component comprising the logo of the organization.

10. The system of claim 9, wherein output port is an audio output port of the mobile device.

11. The system of claim 9, wherein the wiring that couples the audio connector to the headphone is coated using thermally conductive material.

12. The system of claim 9, wherein the output port is thermally coupled to the component that generates heat by one of:
    physically attaching (i) at least a part of the region to (ii) at least a part of the component that generates heat; and
    thermally coupling the region to the component that generates heat via a thermally conductive material.

13. The system of claim 9, wherein the wiring that couples the audio connector to the headphone has metal disposed at or near an outer periphery of the wiring, wherein the metal is configured to dissipate heat.

14. The system of claim 9, wherein the heat dissipating component comprises metal.

15. The system of claim 9, wherein the organization that is of interest to the user of the mobile device excludes organizations that manufacture the mobile device, sell the mobile device, and provide a communication service to the mobile device.

16. The system of claim 9, wherein the mobile device is one of a mobile phone, a cellular phone, and a smart phone.

17. A mobile device comprising:
    a component that generates heat while the mobile device is operational; and
    an audio output port that is thermally coupled to the component that generates heat,
    wherein during a first time period, a headphone is configured to be inserted in the audio output port via an audio connector and wiring,
    wherein during the first time period, heat is dissipated from the component via one or more of the audio connector, the wiring, and the headphone,
    wherein during a second time period, a heat dissipating component comprising a logo of an organization that is of interest to a user of the mobile device is configured to be inserted into the audio output port, and
    wherein during the second time period, heat is dissipated from the component via the heat dissipating component comprising the logo of the organization.

18. The mobile device of claim 17, wherein the audio output port is thermally coupled to the component that generates heat by one of:
    physically attaching (i) at least a part of the region to (ii) at least a part of the component that generates heat; and
    thermally coupling the region to the component that generates heat via a thermally conductive material.

19. The mobile device of claim 17, wherein the heat dissipating component comprises metal.

20. The mobile device of claim 17, wherein the mobile device is one of a mobile phone, a cellular phone, and a smart phone.

* * * * *